Patented Mar. 14, 1950

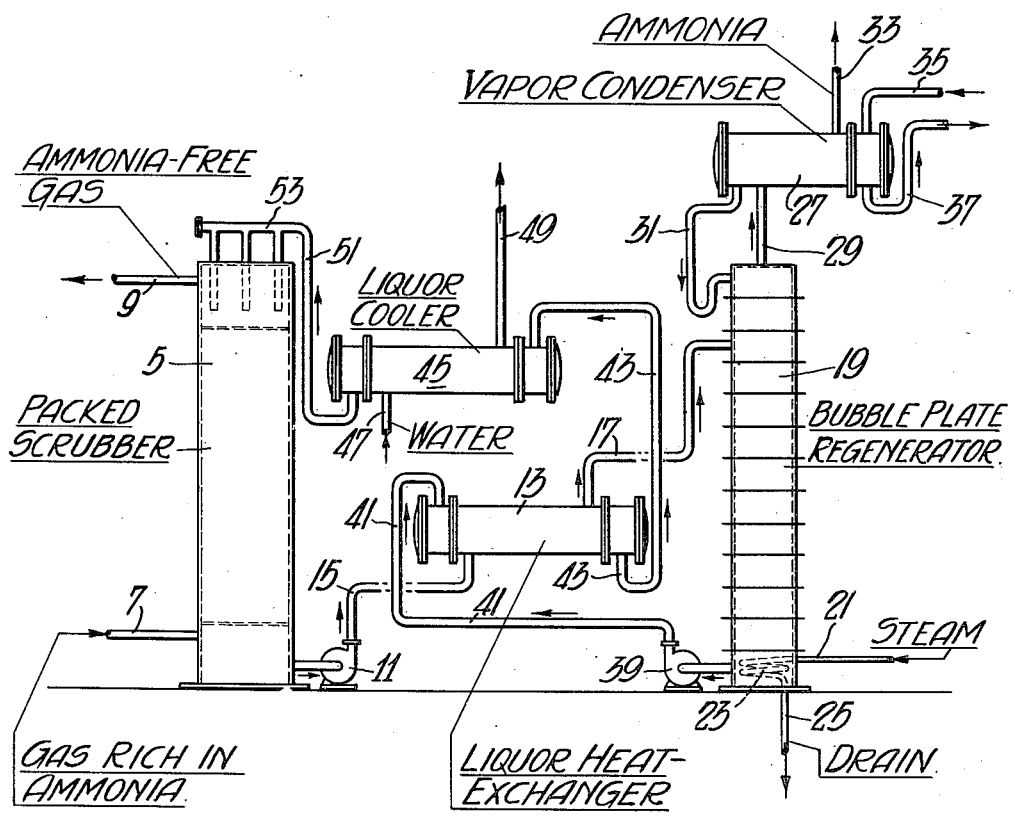

2,500,291

UNITED STATES PATENT OFFICE 2,500,291

PROCESS OF RECOVERING AMMONIA

Charles R. Liebel, Joseph H. Wells, and Philip J. Wilson, Jr., Pittsburgh, Pa., assignors to Carnegie-Illinois Steel Corporation, a corporation of New Jersey Application March 28, 1947, Serial No. 737,942

5 Claims. (Cl. 23—193)

The present invention provides an improved process for recovery of ammonia, together with improved absorption media for use in ammonia recovery operations.

Considerable quantities of ammonia are produced in industrial operations, the ammonia being associated frequently with other gases acting as contaminants. For example, ammonia is produced in coal carbonization processes, notably by-product coking, and escapes from the retorts with coke oven gas and other volatile products.

In the usual practice of recovering ammonia from materials such as coke oven gas, it is the usual practice to condense out the major portions of tar and moisture by cooling, and to absorb the ammonia from the thus initially purified gas by passing the gas through a bath of dilute sulphuric acid, thereby converting the ammonia into ammonium sulphate, which is recovered in crystal form from the mother liquor by standard processes.

However, such procedure causes the ammonia to be lost as such, and due to the competition from synthetic ammonia, the recovery of ammonia as ammonium sulphate from coke oven gas sometimes does not yield a profit; and frequently it is more desirable to recover the ammonia as such in a relatively pure form which can be converted later on into ammonium sulphate, ammonia liquor, or other products to meet market demands. In some instances this is done, the practice being to scrub the gases with water to recover the ammonia, but due to the relatively small concentration of ammonia in the gas, amounting to about six pounds per ton of coal producing about 11,000 cubic feet of gas, the scrubbing liquor is relatively dilute.

Although various arrangements of scrubbers have been tried, it seldom has proved practicable to increase the concentration of ammonia in the aqueous liquor much above ten grams per liter. At the same time, the liquor is contaminated with various amounts of volatile impurities associated with the ammonia, such as carbon dioxide, hydrogen sulphide, hydrogen cyanide, and various tarry compounds, both dissolved and entrained, including the phenols, pyridine bases, and naphthalene. For recovering the ammonia in a more concentrated form and to separate the impurities, the liquor is distilled in continuous stills using direct steam as the heating medium, the steam being passed directly into the liquor; and by the proper design of the rectifying and stripping columns, and control of the conditions, an ammonia gas or liquor of substantially any desired concentration and purity can be produced. But due to the dilute feed and the presence of the impurities, the stills are relatively large and the cost of operation is appreciable.

In accordance with the present invention, there is provided a method for recovering ammonia wherein there is obtained a wholly unexpectedly higher concentration of ammonia in solution with far smaller amounts of acidic impurities than are present in an ordinary water solution.

In accordance with the present invention, an ammonia-bearing gas, such as coke oven gas, is scrubbed, after cooling and condensation of tar and water, with a liquid consisting of an aqueous solution of a salt of an organic base. The organic base should be somewhat weaker than ammonia, should have a boiling point of at least 200° C., and should be substantially insoluble in water. Examples of organic bases which may be employed are quinoline, isoquinoline, methylquinolines, 5,8-dimethylquinoline, tetramethylpyridine, 3 - benzylpyridine, phenylpyridines, ethylaniline, m-toluidine, and xylidenes; but other bases or members of these families may be used, providing they have the properties stated above. The acids required to form the salt of the organic base are preferably the strong mineral acids, such as sulfuric acid, nitric acid, hydrochloric acids, or their acid salts such as sodium hydrogen sulfate.

In practice a mixture containing substantially the ratio of 2.64 per cent by weight of quinoline to one per cent by weight of sulfuric acid, the balance being water, is satisfactory. But whatever the combination that may be employed, enough base preferably is added to combine with all the free acid. Thus, one mol of sulfuric acid will take at least two mols of quinoline. The solution rapidly dissolves ammonia, and in most cases, will contain some ammonia, even after regeneration. In case sufficient base is not present to combine with all the free acid, the latter will be neutralized rapidly with ammonia, and this proportion of the ammonium salt will be circulated continuously in the scrubbing liquid, substantially without further reaction.

The alkalinities of the mixtures that are employed will be controlled by the selection of the organic bases and acids, and their proportions. The solutions of the present invention must be maintained at a pH value of from not below substantially pH 7.5 to not over substantially pH 9, which pH value is lower than that of ammonia-water solutions and sufficiently low to eliminate absorption of any important amounts of acidic gases.

The absorption medium of the present invention is used to scrub coke oven gas until equilibrium between the ammonia in the gas and liquid has been substantially reached. The solution then is sent to a stripping column in which it is heated to drive off the ammonia. The regenerated solution is returned to the scrubber in a cyclic operation.

The present invention will be understood more readily from a consideration of the accompanying drawing in which:

The single figure is a diagrammatic flow sheet of the process.

Referring more particularly to the drawing, a gas containing ammonia, and specifically coke oven gas, is introduced into the bottom of a packed scrubbing tower 5 through a pipe 7, where the gas contacts the absorbing medium of the character referred to above. The resulting ammonia-free gas passes out from the top of the scrubber 5 through pipe 9.

The resulting ammonia liquor is pumped by pump 11 into heat exchanger 13 through line 15, in which the liquors are pre-heated before being introduced through the line 17 which passes into the upper portion of a bubble plate regenerator tower 19, through which the liquors flow from one plate to another, and become progressively stripped of their ammonia content by steam introduced as indicated at 21 into the base of the tower, either directly into the liquors or in heat exchange relation therewith in a coil 23, from which condensate is drained through drain 25.

As the ammonia liquors pass downwardly through the tower 19, they become stripped of their ammonia content, and some of the absorbent liquid itself may be vaporized. Therefore, a reflux condenser 27 is provided for receiving vapors from the top of the tower, as indicated at 29. Condensate absorbent is returned to the tower 19 through line 31, and the released ammonia passes to a suitable collecting or recovering equipment through line 33. The condenser 27 is cooled by circulating water which enters through intake 35 and is withdrawn through exit 37.

The heated stripped absorbent that collects in the bottom of the tower is pumped by pump 39 through a pipe line 41 into the heat exchanger 13, where the absorbent preheats incoming ammonia liquors to the tower. The absorbent, now partially cooled, passes through a pipe line 43 into a cooler 45, which is cooled with water entering the cooler at 47 and passing from the cooler at 49. The cooled absorbent flowing through the pipe 51 is sprayed or otherwise distributed in the top of the packed scrubbing tower 5 through distributor 53 for absorbing fresh quantities of ammonia. As will be seen, the operation proceeds in a closed cycle.

As shown, the scrubbers 5 are of standard types, usually counter-current, packed scrubbers, although the bubble plate type also may be used.

The preferred construction of the regenerator 19 is a bubble-plate column, provided with a source of heat at the base and a condenser at the top, the condenser cooling the ammonia gases from the column so that the water in it can be refluxed, and also any absorbent that may be vaporized. In some instances, it will be found best to operate under vacuum rather than at atmospheric pressures. Heat exchangers for recovery of heat in the hot, regenerated liquid or the vapors, may be provided, as shown.

In practice, it is preferred to work at a pH value of from pH 8 to pH 9 to reduce corrosion of steel equipment and at the same time prevent the absorption of appreciable amounts of acidic gases. The acidic gases are not absorbed to an appreciable extent until the pH value reaches pH 9.5 or above.

In order to reduce losses by vaporization of the absorbent base into the gas in the scrubbing operation, the use of an absorbent base boiling about 250° C. or above is preferable. Since the absorbent base is substantially insoluble in the scrubbing liquid when it is enriched with ammonia, the base forms a separate phase as it is displaced from combination with the acid, and this reduces any tendency of ammonia to escape until the regeneration stage is reached.

The details of the invention as hereinabove set forth may be varied within the skill of the operator as may be necessary to adapt them to varying conditions and uses, as defined in the appended claims.

We claim:

1. A process for selectively absorbing ammonia from gases containing the same, which comprises absorbing the said ammonia in a liquid absorbent composed of an aqueous solution of a mineral acid salt of an aromatic base, the base being substantially insoluble in water and having a boiling point of at least 200° C., the absorbent liquid having an initial pH value of between approximately pH 7.5 and pH 9, and recovering the resulting absorbed ammonia from the liquid by heating the resulting absorbent and ammonia mixture until the ammonia is released therefrom.

2. A process for selectively absorbing ammonia from gases containing the same, which comprises passing the ammonia-containing gas through an absorbent liquid composed of an aqueous solution of a mineral acid salt of an aromatic base, the base being substantially insoluble in water, the absorbent liquid having an initial pH value of between approximately pH 7.5 and pH 9.

3. A process for selectively absorbing ammonia from gases containing the same, which comprises passing an ammonia-containing gas through an absorbent liquid composed of an aqueous solution of a mineral acid salt of an aromatic base, the said aromatic base being substantially insoluble in water and having a boiling point of at least substantially 250° C., the absorbent liquid having an initial pH value of between approximately pH 7.5 and pH 9.

4. A process for selectively absorbing ammonia from gases containing the same, which comprises absorbing the said ammonia in a liquid absorbent composed of an aqueous solution of a mineral acid salt of an aromatic base, the base being substantially insoluble in water and having a boiling point of at least 200° C., the absorbent liquid having an initial pH value of between approximately pH 7.5 and pH 9.

5. A process for selectively absorbing ammonia from gases containing the same, which comprises absorbing the said ammonia in a liquid prepared by mixing an aromatic base with a water solution of a mineral acid, the base being substantially insoluble in water and having a boiling point of at least 200° C., the absorbent liquid having an initial pH value of between approximately pH 7.5 and pH 9.

CHARLES R. LIEBEL.
JOSEPH H. WELLS.
PHILIP J. WILSON, Jr.

REFERENCES CITED

The following references are of record in the file of this patent:

UNITED STATES PATENTS

| Number | Name | Date |
| --- | --- | --- |
| 1,631,720 | Davis | June 7, 1927 |
| 1,936,864 | Sperr | Nov. 28, 1933 |
| 1,983,375 | Jacobson | Dec. 4, 1934 |
| 2,106,734 | Gollmar | Feb. 1, 1938 |
| 2,410,906 | Stewart | Nov. 12, 1946 |
| 2,435,663 | Wells, et al. | Feb. 10, 1948 |

OTHER REFERENCES

Meredith et al.: "Recovery of Pyridine Bases from Coke Oven Gas and Methods for Determining Them," American Gas Journal, November 1941, pages 69, 77, and 78.